Aug. 25, 1964 F. KUHRT ETAL 3,146,317

HALL-EFFECT MAGNETIC TRANSDUCER

Filed July 11, 1960

United States Patent Office 3,146,317

Patented Aug. 25, 1964

3,146,317
HALL-EFFECT MAGNETIC TRANSDUCER

Friedrich Kuhrt and Gustav Stark, Nurnberg, Germany, assignors to Siemens-Schuckertwerke Aktiengesellschaft, Berlin-Siemensstadt and Erlangen, Germany, a corporation of Germany Filed July 11, 1960, Ser. No. 41,973
Claims priority, application Germany July 14, 1959
7 Claims. (Cl. 179—100.2)

Our invention relates to transducers for the reproduction, or the selective reproduction and recording, of magnetrograms such as magnetic signals recorded on tape as used, for example, in magnetic tape recorders. Another type of magnetrogram carrier suitable for transducers with which our invention concerns itself, consists of magnetizable discs, foils, belts, wires or other carriers made either of magnetizable material or of non-magnetic material with a coating or inclusion of magnetizable powder.

The conventional transducers for recording and reproducing magnetic signals generally operate with a magnetizable core structure on which an induction coil is mounted. Due to relative travel between the magnetogram carrier and the transducer head, electric voltages are induced in the inductance coil in dependence upon the magnetic signals of the carrier. It has also become known to provide a transducer head in which, in lieu of an inductance winding or in addition to such a winding, a Hall-voltage generating plate is mounted in a field gap of the core structure so that Hall voltages are produced in the plate in dependence upon the magnetic signals to be sensed. It has further been proposed to embed such a Hall plate between two pole pieces of ferrite which together form a field gap. Preferably, the Hall plate is mounted directly in the field gap at a location close to the magnetogram carrier during the operation of the device.

The width of the gap between the two pole pieces of ferrite is critical for the maximum sensing frequency of the transducer at a given travelling speed of the magnetrogram relative to the transducer head. It is therefore desirable to make this gap as narrow as possible.

As mentioned, it is desirable to locate the Hall-effect plate close to the front face of the transducer head. However, this is not always feasible to a satisfactory extent because, as a rule, the Hall-effect plate must be set back from the front edge of the pole pieces, for example about 1 mm., in order to permit accommodating the circuit lead connected to the Hall electrode on the front edge of the plate. Thus the portion of the semiconductor plate actively participating in the generation of Hall voltage is likewise more remote from the front face than desirable for best sensitivity and best frequency characteristics. This is because a portion of the magnetic signal flux passes through the space between the front edge of the Hall electrode and the front face of the transducer, or through any front-edge portion of the Hall plate as may be used as a circuit lead for the front electrode proper and hence does not contribute to the generation of transducer output voltage.

It is an object of our invention to minimize or eliminate the above-mentioned shortcomings by increasing the portion of the magnetic signal flux actively participating in producing the Hall-effect, thus increasing the sensitivity and upper frequency response limit of the transducer.

According to our invention, a bridge piece of ferrite or a corresponding magnetizable material is disposed between the Hall plate and at least one of the two pole pieces of the magnetizable core structure so as to be in face-to-face contact with the plate as well as with the pole piece, and this bridge piece is provided with an isthmus portion or constriction extending preferably in substantially parallel relation to the front face of the transducer head and hence to the front edge of the bridge piece. The constriction is formed by a recess, such as a groove or shoulder, of the bridge piece and need have a depth of only a few tenths of one millimeter. Preferably, the recess is located a slight distance, for example 1 mm., away from the front face of the transducer head.

By virtue of such a recess, or of the constriction formed thereby in the bridge piece, the otherwise ineffective portion of the magnetic flux is directed to the active area of the ferrite bridge piece that is located between the two Hall electrodes of the Hall plate, thus increasing the sensitivity of the transducer.

According to our copending application Serial No. 41,190, filed July 6, 1960, entitled Transducer for Magnetic Recordings, assigned to the assignee of the present invention and now abandoned, soft-magnetic coatings or sheet metal layers are disposed upon the front face of a magnetic signal transducer of the above-mentioned type for the purpose of reducing the effective gap width which, in view of the porosity of ferrite materials is smaller than the geometrically measured width. When using such coatings or layers of soft-magnetic non-porous metal on the transducer front face, the improvement according to our present invention can be achieved already by simply giving the ferrite bridge piece a stepped recess along its front edge.

The invention will be further described with reference to the embodiments illustrated by way of example on the accompanying drawing in partly simplified and schematical representation, similar components in all illustrations being denoted by the same reference characters respectively.

Figure 1:
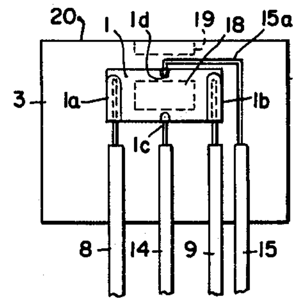
FIG. 1 is an embodiment of a Hall-effect transducer of the present invention for magnetic signals with one of the appertaining pole pieces removed to show the interior.
Figure 2:
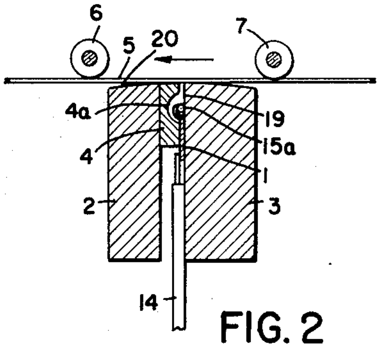
FIG. 2 is a lateral view of the embodiment of the complete transducer of FIG. 1 in conjunction with a magnetic recording tape.

The transducer according to FIGS. 1 and 2 comprises a semiconducting Hall plate 1 between two pole pieces 2, 3 of ferrite. The pole piece 3 forms a base and the pole piece 2 a cover plate. Located between the Hall plate 1 and the cover plate 2 is a rectangular bridge piece 4 also consisting of ferrite. The bridge piece 4 has a groove 4*a* extending parallel to the front face 20 of the transducer head and forming a constricted cross-sectional portion in piece 4. As mentioned above, the ferrite plate 2 and the bridge piece 4 are removed in the illustration of FIG. 1. However, FIG. 1 shows by broken lines two rectangular areas 18 and 19 at which the bridge piece 4 contacts the planar pole face of the base 3. The above-described parts 1, 2, 3 and 4 are firmly attached together, for example, by cementing or other fastening means, or also by means of a housing or a block of casting resin (not illustrated) in which these parts are wholly or partially embedded.

The semiconductor plate 1 consists of a thin wafer or of a coating deposited upon the base 3 and is made of a suitable semiconducting substance. Particularly suitable for the purposes of the invention are Hall plates consisting of semiconducting $A^{III}B^{V}$ compounds, namely compounds of an element from the third group with an element from the fifth group of the periodic system of elements, as known from U.S. Patent No. 2,798,989 of H. Welker, assigned to the assignee of the present invention. Preferably employed are indium arsenide (InAs) or indium antimonide (InSb).

The Hall plate 1 is provided with two current supply electrodes 1*a*, 1*b* located on opposite narrow edges of the rectangular plate, and with two probe or Hall electrodes 1*c* and 1*d* located on the respective two long edges midway between the two current supply electrodes. Connected to the electrodes 1*a*, 1*b*, 1*c* and 1*d* are respective leads 8, 9, 14 and 15.

Figure 5:
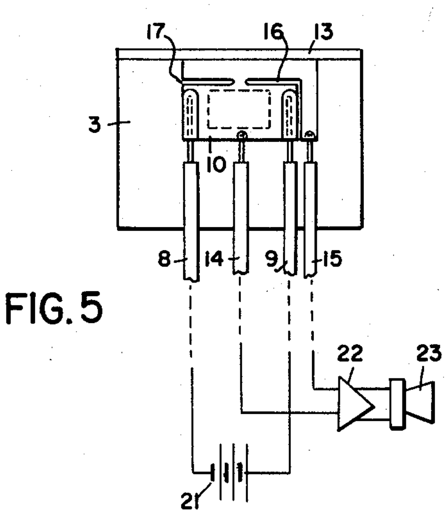
FIG. 5 illustrates, in a manner similar to FIG. 1, a third embodiment of a transducer of the present invention together with a schematic representation of an appertaining circuit diagram.

During operation of the transducer, an electric current passes from a suitable source, such as shown at 21 in FIG. 5, through the electrodes 1*a*, 1*b* and the Hall plate. The magnetogram carrier 5 (FIG. 2), shown guided by rollers 6 and 7, then passes along the front face 20 and over the transverse gap between the bridge piece 4 and the base member 3 of the magnetizable core structure. When the transducer is not subjected to a magnetic signal, i.e. when the carrier does not have a magnetic signal recorded at the spot located at a time in front of the sensing gap, the two Hall electrodes 1*c* and 1*d* have the same potential so that the transducer output voltage is zero. However, when a magnetic signal is located in front of the sensing gap, the magnetic effect imposed upon the Hall plate 1 causes the two electrodes 1*c* and 1*d* to assume respectively different potentials so that a corresponding transducer voltage is impressed upon the output circuit.

As shown in FIGS. 1 and 2, the Hall plate 1 is set off from the front face 20 of the transducer head a sufficient amount, for example about 1 mm., to permit passing the portion 15*a* of lead 15 to the Hall electrode 1*d* on the long front edge of the plate. The lead portion 15*a* extends through the above-mentioned transversal groove 4*a* of the bridge piece 4. However, the groove mainly serves a different purpose explained presently.

When assembling the transducer device, the bridge piece 4 is placed in face-to-face contact with the cover plate 2 of ferrite, and these parts are then assembled together with the base plate 3, also of ferrite, on which the thin Hall plate 1 is deposited. The Hall plate thus is placed between bridge piece 4 and base plate 3, so that the desired narrow field gap will remain at 19 between the front portion of the bridge piece 4 and the cover plate 3 immediately adjacent the location of the magnetogram carrier 5. Normally, however, the above-mentioned spacing of the Hall plate from the front face 20 would entail a portion of the magnetic flux, caused by any signal of the magnetogram carrier in the sensing gap, to become lost with respect to the above-described generation of Hall voltage. This non-utilized flux portion is the one that passes from the bridge piece 4 to the cover plate 3 immediately adjacent to the front face 20 of the transducer. However, due to the fact that the bridge piece 4 is transversely constricted by the groove 4*a*, the amount of flux thus shunted near the front face is reduced and a correspondingly greater amount of signal flux becomes effective in the active semiconductor area of the Hall plate. The remaining narrow gap between bridge plate 4 and base plate 3 at the location 19 may be filled with non-magnetic material.

Figure 3:
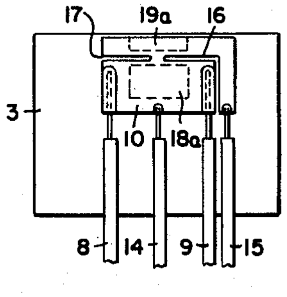
FIG. 3 is a view, similar to FIG. 1, of another embodiment of a transducer of the present invention.
Figure 4:
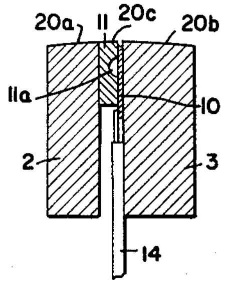
FIG. 4 is a cross section of the embodiment of the transducer of FIG. 3, the section being taken substantially in the vertical center plane relative to FIG. 3.

In the embodiment according to FIGS. 3 and 4, the semiconductor plate 10, consisting of a wafer or coating as described above, has two slits 16 and 17. The slits separate from the active Hall plate a strip to which the lead 15 is connected and which forms a continuation of that lead to the narrow bridge remaining between the strip and the main body of the Hall plate. This narrow bridge, in effect, constitutes a Hall electrode corresponding to the one denoted by 1*d* in FIG. 1. In all other respects the transducer of FIGS. 3, 4 is similar to the one described with reference to FIGS. 1 and 2, except that the ferrite bridge piece denoted by 11 in FIG. 4, has its transverse groove 11*a* so located that the bridge piece 11 is in face-to-face contact with the Hall plate 10 at the two areas denoted by 18*a* and 19*a*, the area 19*a* being located on the strip portion of the semiconductor body. The front faces 20*a* and 20*b* of the respective pole pieces 2 and 3 are ground and lapped, as well as the front face 20*c* of the ferrite bridge piece 11.

Figure 6:
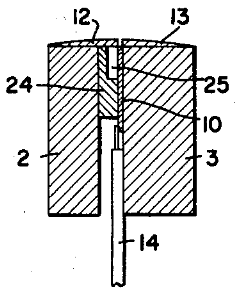
FIG. 6 is a cross section of the embodiment of the transducer of FIG. 5.

In the transducer according to FIGS. 5 and 6 the two pole pieces 2 and 3 have their respective front faces covered by soft-magnetic sheet metal pieces 12 and 13 for reducing the effective gap width, as is more fully described in our copending application Serial No. 41,190, filed July 6, 1960, and now abandoned, mentioned above. The sheet metal members 12 and 13 consist of non-porous metallic material of high permeability, for example of such material as is available under the trade names Mu-Metal and Vakodur. When using such facing sheets, it suffices for the purpose of the present invention if the ferrite bridge piece 24 is given a reduced cross section along its front edge by means of a recess 25 of stepped shape.

As mentioned above, the groove, step or other recess of the bridge piece can be additionally utilized for other purposes. Thus, according to FIGS. 1 and 2, the lead for the frontal Hall electrode may pass through this recess. For example, a thin copper wire may be mounted in the recess and may extend from the Hall electrode toward both sides out of the recess thus forming a two-part symmetrical loop connection for the front electrode for obtaining an increased total conductor cross section (formed by the two branch leads) and to avoid or minimize inductance effects of the Hall-plate leads.

The gap portion adjacent to the front face 20 of the transducer may be filled with such non-magnetic material as mica foil or gold foil, the foil thickness being equal to the thickness of the Hall plate.

As a rule, the reduction in cross section produced by the transverse recess of the bridge piece may amount to a few tenths of 1 mm., being generally between 0.1 and 0.6 mm. When providing a groove in spaced relation to the frontal edge of the bridge piece (FIGS. 2, 4), the spacing of the groove from the front edge of the bridge piece is preferably less than 1 mm.

It will be understood that the illustrated devices are shown on enlarged scale. Actually, for example, the semiconductor plate 1 in FIGS. 1, 2, consisting of InSb or InAs, may be 5 mm. long, 2 mm. wide, and 0.005 mm. thick.

We claim:

1. A transducer for magnetic signals, comprising a magnetizable core structure having a front face for coaction with an adjacent magnetogram carrier, said core structure having two pole pieces forming between each other a space extending away from said front face, a Hall-effect plate disposed in said space and having transducer-circuit electrodes, a bridge piece of magnetizable porous material interposed between said plate and one of said pole pieces and in face-to-face contact with both, said bridge piece having a recess extending in a direction substantially parallel to said front face and forming a locally constricted cross section of said bridge piece, said pole pieces and said bridge piece forming a magnetic gap in which said Hall-effect plate is positioned and which is narrower at said front face than at the recess of the said bridge piece.

2. A transducer for magnetic signals, comprising a magnetizable core structure having a front face for coaction with an adjacent magnetogram carrier, said core structure having two pole pieces forming between each other a space extending from said front face in a transverse direction thereto, a Hall-effect plate of semiconductor material disposed in said space and having transducer-circuit electrodes, a magnetizable bridge piece of ferrite interposed between said plate and one of said pole pieces and in face-to-face contact with both, said bridge piece having a constriction-forming recess extending substantially parallel to said front face on the bridge-piece side facing said semiconductor plate, said pole pieces and said bridge piece forming a magnetic gap in which said Hall-effect plate is positioned and which is narrower at said front face than at the recess of the said bridge piece.

3. A transducer for magnetic signals, comprising a magnetizable core structure having a front face for coaction with an adjacent magnetogram carrier, said core structure having two pole pieces of ferrite with respective planar faces extending parallel to each other and at a right angle to said front face so as to form a space between each other, a semiconductor Hall-effect plate disposed in said space in face-to-face contact with one of said pole pieces, a bridge piece of ferrite disposed between the other side of said plate and said other pole piece and in face-to-face contact with both, said bridge piece having a constriction-forming recess extending substantially parallel to said front face on the bridge-piece side facing said semiconductor plate, said pole pieces and said bridge piece forming a magnetic gap in which said Hall-effect plate is positioned and which is narrower at said front face than at the recess of the said bridge piece.

4. In a transducer according to claim 2, said recess having a depth between 0.1 and 0.5 mm.

5. In a transducer according to claim 2, said recess being spaced less than 1 mm. from the frontal edge of said bridge piece.

6. In a transducer according to claim 2, said Hall effect plate having an electrode on the plate edge close to said front face, and a circuit lead connected to said electrode and extending through said recess.

7. A transducer for magnetic signals, comprising a magnetizable core structure having a front face for coaction with an adjacent magnetogram carrier, said core structure having two pole pieces forming between each other a space extending from said front face in a transverse direction thereto, a Hall-effect plate of semiconductor material disposed in said space and having transducer-circuit electrodes, a magnetizable bridge piece of ferrite between said plate and one of said pole pieces, said bridge piece being in planar face-to-face contact with said semiconductor plate and having a constriction-forming recess extending substantially parallel to said front face on the bridge-piece side facing said semiconductor plate, said pole pieces and said bridge piece forming a magnetic gap in which said Hall-effect plate is positioned and which is narrower at said front face than at the recess of the said bridge piece.

References Cited in the file of this patent

UNITED STATES PATENTS

| | | |
|---|---|---|
| 2,774,890 | Semmelman | Dec. 18, 1956 |
| 2,866,013 | Reis | Dec. 23, 1958 |
| 2,900,451 | Havstad | Aug. 18, 1959 |
| 2,978,545 | Howling | Apr. 4, 1961 |